Aug. 27, 1968  E. J. SAXL  3,398,575
HEAVY DUTY TENSION METER
Filed Jan. 3, 1966  2 Sheets-Sheet 1
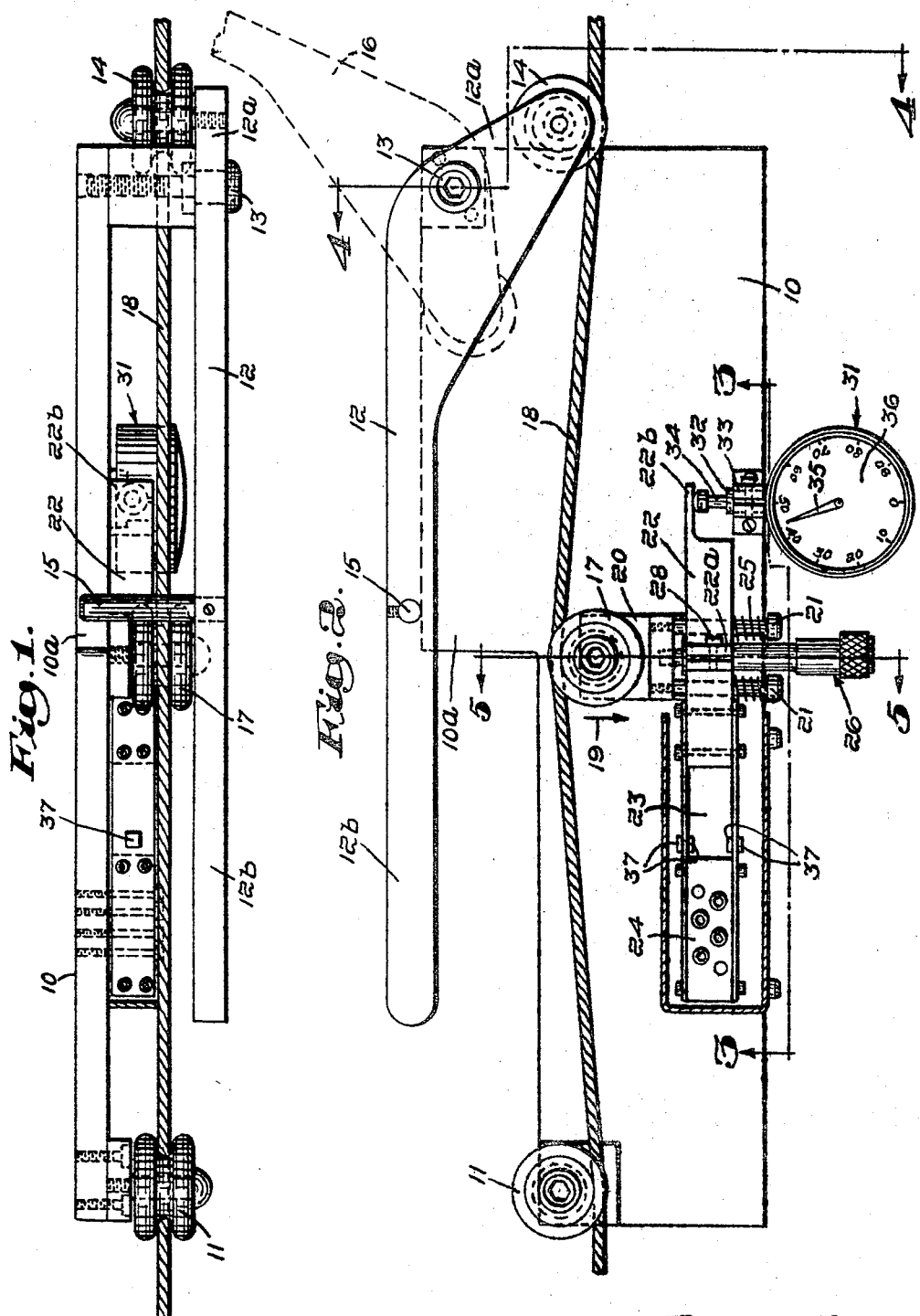
Inventor:
Erwin J. Saxl,
by Arthur D. Thousan
Attorney

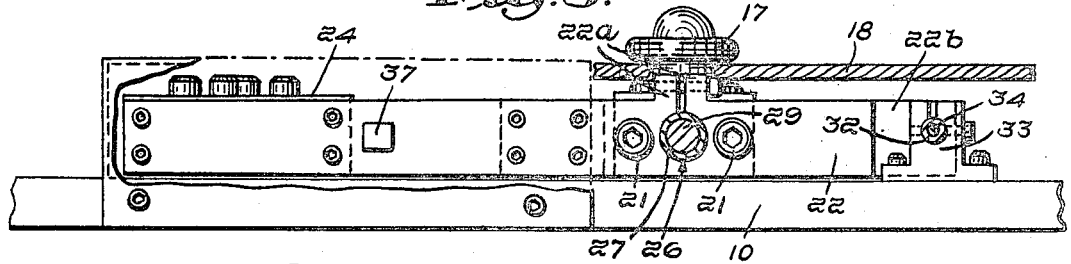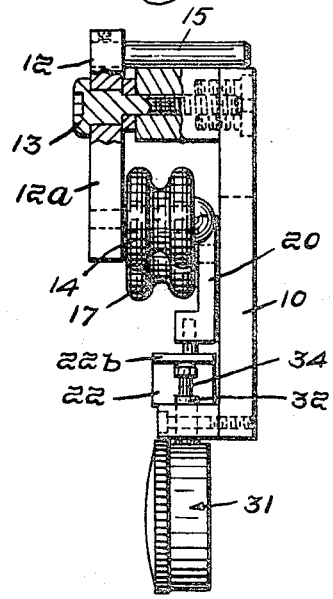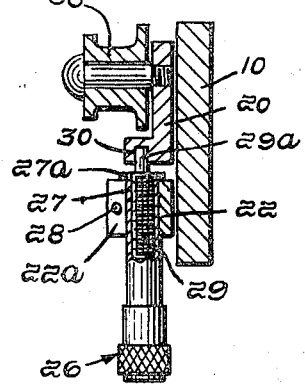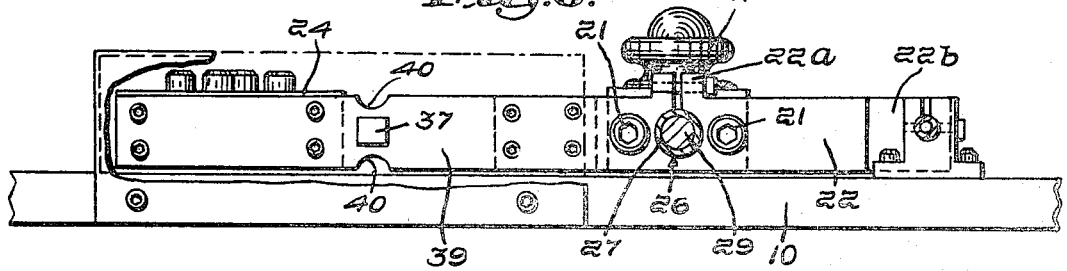

United States Patent Office 3,398,575
Patented Aug. 27, 1968

3,398,575
HEAVY DUTY TENSION METER
Erwin J. Saxl, Harvard, Mass. 01451
Filed Jan. 3, 1966, Ser. No. 518,317
1 Claim. (Cl. 73—144)

ABSTRACT OF THE DISCLOSURE

A tension meter for measuring tension in standing or running cables. The meter has three rollers mounted on a base. The middle roller engages the cable on the side opposite that engaged by the other two rollers, and is movable transversely under cable tension. The middle roller is mounted on a pair of cantilever beams and the bending force on the beams, resulting from tension in the cable is measured by a mechanical detector or strain gauges mounted on the beams. The position of the middle roller with respect to the beams is adjustable to provide compensation for stiffness and thickness of cables of various sizes. One of the end rollers is mounted on a lever pivoted at one end of the plate. The lever can be manually swung to move the roller it carries in and out of operative position.

---

This invention relates to meters for measuring tension in running or stationary filamentary materials, and more particularly to tension meters for the higher tension ranges for use on heavy cables, tapes, metal strapping and similar materials.

The principal object of this invention is to provide a heavy duty tension meter which is simple, reliable, accurate, and easy to apply to the cable or other material. Another object is to provide a meter which automatically locks onto the cable and cannot be accidentally removed. Another object is to provide a simple device for adjusting the meter to compensate for differences in cable thickness. Other objects, advantages, and novel features will be apparent from the following description.

The meter consists of a pair of stationary rollers, mounted at opposite ends of a base plate, and an intermediate roller which is movable transversely with respect to the cable and is connected to a detecting linkage. One of the stationary rollers is mounted on a lever pivoted on the base plate and the lever can be manually swung between an open position, in which the rollers are separated to facilitate insertion of the cable, and a closed position, in which the cable is deflected by the three rollers. The detecting linkage comprises a pair of cantilever spring beams having their free ends connected together by a block which operates a mechanical gage. The intermediate roller is mounted on an assembly controlled by a micrometer screw by means of which the transverse distance between that roller and the other rollers at zero tension can be varied.

In the drawings illustrating the invention:

FIG. 1 is a top plan view of a tension meter constructed according to the invention;

FIG. 2 is a side elevation of the meter;

FIG. 3 is a cross-section, partly broken away, taken along line 3—3 of FIG. 2;

FIG. 4 is an end view, partly in cross-section taken along line 4—4 of FIG. 2;

FIG. 5 is a cross-section taken along line 5—5 of FIG. 2; and FIG. 6 is a cross-section similar to FIG. 3 showing a modification of the tension sensing beam.

The parts of the meter are mounted on a base plate 10 having an upward extension 10a. A fixed roll 11 is rotatably mounted on the left-hand end of the block. A lever 12 is mounted on a pin 13 secured to the right-hand end of extension 10a. The lever has a portion 12a, extending to the right of pin 13 which is the fulcrum point, and a handle portion 12b extending to the left of pin 13. Portion 12a carries a rotatably mounted roller 14. In the closed position of the lever, as shown in full line in FIG. 2, roller 14 is in line with roller 11. The lever carries a stop pin 15 which engages extension 10a in the closed position. The lever can be swung to an open position, indicated by the dot and dash line 16 in FIG. 2, to facilitate insertion of the cable.

A movable indicator roller 17 is mounted centrally between rollers 11 and 14. The three rollers are aligned laterally, as shown in FIG. 1. The cable 18 or other fiilamentary material in which tension is to be measured, passes under rollers 11 and 14 and over roller 17. The latter is so positioned as to deflect the cable from a straight path. Tension applied to the cable tends to straighten it and produces a force, proportionate to the tension, on roller 17 in the direction of arrow 19.

Roller 17 is mounted on an angle bracket 20 secured to bolts 21 which pass freely through block 22. The block is mounted on a pair of flat parallel beams 23, made of spring steel, which are supported on a block 24 secured to the base plate 10. Bracket 20 is drawn toward block 22 by a pair of coil springs 25 surrounding bolts 21.

A micrometer, generally indicated by the numeral 26, is mounted in block 22. As shown more clearly in FIG. 5, block 22 is bored to receive the barrel 27 of the micrometer and has a pair of spaced tabs 22a forming, in effect, the ends of a split collar which is tightened about the barrel by screw 28. The barrel has a shoulder 27a to keep it from backing out. The screw 29 of the micrometer has an end portion 29a which is slidably received in a recess 30 in block 20. The micrometer serves as an adjustable stop which determines the position of block 20, and therefore roller 17, with respect to block 22.

A mechanical gage, generally indicated by the numeral 31, is supported on the base plate. The gage is mounted by a collar 32 clamped in a split block 33, and has a movable pin 34 which is engaged by a finger 22b projecting from block 22. The gage is operated by any of a number of well-known mechanisms which translate linear movement of pin 34 into rotary movement of a pointer 35 over a suitably calibrated dial 36.

To use the meter, the lever 12 is rotated to the open position so that the three rolls 11, 17 and 14 can be applied to a straight cable. The lever is then swung to closed position so that the cable is deflected to operating position. In moving to closed position the portion 12a of the lever travels past the dead center point with respect to pin 13, so that the meter is automatically locked on the cable. The component of force on roller 14 transverse to the cable, resulting from tension in the cable, is in such a direction as to hold the lever in closed position. The stop pin 15 positions roller 14 so that it is in line with roller 11.

The component of force due to cable tension, transmitted to roller 17, in the direction transverse to the cabel, is proportionate to the sine of the angle A of the deflected portion of the cable with respect to the straight direction of the cable. For small angles, as is the case here, the sine of the angle may be considered equal to the angle. The angle A is determined by the distance, in the transverse direction, between the bearing surfaces of rollers 11 and 14 and that of roller 17, and the thickness of the cable. The dial 36 of the gage 31 is calibrated to indicate cable tension for a given angle A. When the thickness of the cable is changed, readings on the dial would be inaccurate, because of the change in angle A, unless a compensating change were made in the transverse spacing of the rollers. This is done by means of the micrometer 26 which adjusts the position of block 20, carrying roller 17, with respect to the parallel beams 23. The micrometer is preferably calibrated for cable thickness or a table of micrometer settings corresponding to cable thicknesses supplied with the instrument. Accurate readings of tension can thus be readily obtained on a single dial scale, for a wide range of cable thicknesses.

It is understood that the movement of roller 17 due to bending of the beams 23 under force due to tension, is relatively small. This movement is mechanically multiplied before it is applied to gage 31, because of the fact that block 22 extends a considerable distance beyond the point of application of the force.

It will be noted that the cantilever beam assembly, consisting of beams 23 and block 22, is substantially rigid from the left-hand side of the block to the free end. All bending strain is concentrated in the flexible region between block 22 and the mounting block 24. Electrical strain gages 37 of well-known type are mounted on the upper and lower surfaces of each beam. These may be connected in appropriate circuits to yield an electrical signal proportionate to the cable tension for remote indication.

FIG. 5 illustrates a modified form of roller 38 which may be used for all three rollers to adapt the instrument for use on flat tape or strapping.

In FIG. 6 a modified form of detecting beam assembly is shown. A pair of parallel beams 39, having side notches 40, are used in place of beams 23. Strain gages 41 are mounted on both surfaces of both beams between the notches. The bending strain is concentrated in the region between the notches so that a stronger electrical signal is obtained. This form of the meter is preferred if the meter is to be used primarily with an electrical indication system.

One of the advantages of the instrument is that it is simple to calibrate during manufacture. Once the proper setting of the micrometer for a given cable thickness has been determined, a cable may be inserted and known tension loads applied. The parallel beams are initially made slightly oversize. Either their sides or their surfaces are then machined off until the readings on dial 36 exactly correspond to the known tension loads.

What is claimed is:
1. A tension meter comprising: a base; first and second spaced stationary filament engaging elements mounted on said base; a pair of parallel cantilever beams having fixed ends mounted on said base and free ends disposed intermediate said first and second elements; a rigid member connecting said free ends together; a pair of parallel members slidably received in said rigid member; a bracket mounted on said parallel members; a third filament engaging element mounted on said bracket, said three elements being disposed to engage a filament between them, with said third element on the opposite side of the filament from said first and second elements and being offset therefrom so that to deflect the filament from a straight path in such a direction that tension applied to the filament results in a compressive force on said third element; said parallel members being slidable in the direction of said force; spring means acting on said bracket in the same direction as said force to urge said bracket toward said rigid member; a micrometer screw threadably received in said rigid member and bearing on said bracket; said screw serving both to adjustably limit the travel of said bracket toward said rigid member under the influence of said spring means and to transmit said force to the free ends of said beams to produce bending of said beams; and indicator means, to measure bending of said beams.

References Cited
UNITED STATES PATENTS

| 1,631,143 | 6/1927 | Matthews et al. | 73—144 |
| 1,650,603 | 11/1927 | Burton | 73—144 |
| 1,757,933 | 5/1930 | Klemperer | 73—144 |
| 2,795,136 | 6/1957 | Matt | 73—144 |

FOREIGN PATENTS

| 988,667 | 5/1951 | France. |
| 153,797 | 7/1963 | Russia. |

RICHARD C. QUEISSER, *Primary Examiner.*

J. H. WILLIAMSON, *Assistant Examiner.*